May 13, 1930.　　　　H. REICHEL　　　　1,758,409
BEAD CUTTER
Filed Oct. 28, 1926　　　3 Sheets-Sheet 1

Inventor
Hugo Reichel.

May 13, 1930.  H. REICHEL  1,758,409
BEAD CUTTER
Filed Oct. 28, 1926   3 Sheets-Sheet 2

Inventor
Hugo Reichel
By Ernst E. ... Atty.

May 13, 1930.  H. REICHEL  1,758,409
BEAD CUTTER
Filed Oct. 28, 1926   3 Sheets-Sheet 3
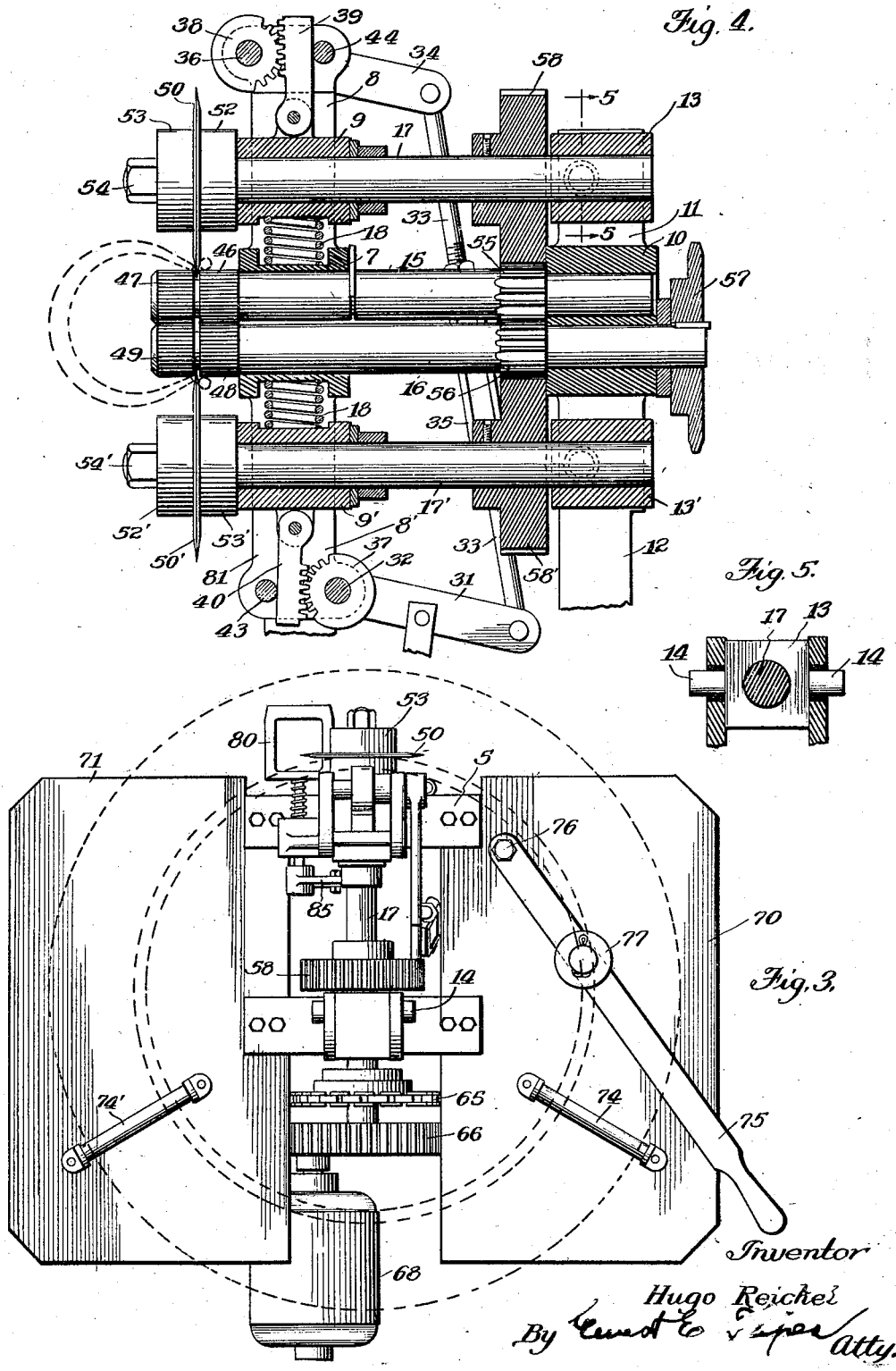
Inventor
Hugo Reichel Patented May 13, 1930

1,758,409

UNITED STATES PATENT OFFICE

HUGO REICHEL, OF CHICAGO, ILLINOIS

BEAD CUTTER

Application filed October 28, 1926. Serial No. 144,888.

My invention relates to cutting mechanisms suitable for cutting belts or other heavy fabrics, and is especially adapted for removing the clenchers or beads from automobile tires.

It is customary in the case of old and worn out or defective tires to treat the same in order to regain the rubber therein for use in making other tires. The beads or clenchers of such tires, however, contain such a small percentage of rubber that it is not available from an economical standpoint and for that reason the beads are customarily removed from the old tire prior to treatment for salvage of the rubber in the latter.

Heretofore in removing the beads or clenchers from an automobile tire, the latter was placed in position on the machine and one of the beads removed or cut therefrom, the tire was then turned over, again positioned on the machine and the remaining bead cut therefrom, thus necessitating two full operations for the removal of both beads from the tire.

The object of my invention is the provision of novel and efficient means for simultaneously removing both beads or clenchers from an automobile tire in a single operation.

A further object of my invention is the provision of a device of this kind having a plurality of cutting members all of which may be simultaneously operated by a single manual controlling means.

A still further object of my invention is the provision of a device of this kind having novel and efficient means for facilitating the placing of an automobile tire in position for the simultaneous removal of both beads or clenchers therefrom.

A still further object of my invention is the provision of a device of this kind having a plurality of rotatable cutting members which are normally maintained in an inoperative position, and which are simultaneously moved to operative position by a single manual control.

A still further object of my invention is the provision of a device of this kind having a plurality of cutting members that may be simultaneously adjusted to cut to any desired depth by a single adjusting means.

A still further object of this invention is the provision of a device of this kind having a plurality of rotatable cutting members which may rotate only when in operative position.

A still further object of my invention is the provision of a device of this kind having novel and efficient means for feeding the tire to the cutters as the former is being cut.

A still further object of my invention is the provision of a device of this kind which will be strong, simple, durable and convenient to operate.

In order that the invention may be readily understood a preferred embodiment of the same is set forth in the accompanying drawings and in the detailed description based thereon. As, however, the invention is capable of embodiment in other and varied constructional forms the drawing and description are to be construed in an illustrative and not in an unnecessarily limiting sense.

In the accompanying drawings wherein like or similar reference characters indicate like or corresponding parts:

Figure 3 is a top plan view of the same;

Figure 4 is a view in section taken on line 4—4 of Figure 1; and

Figure 5 is a view in section taken on line 5—5 of Figure 4.

Figure 1:
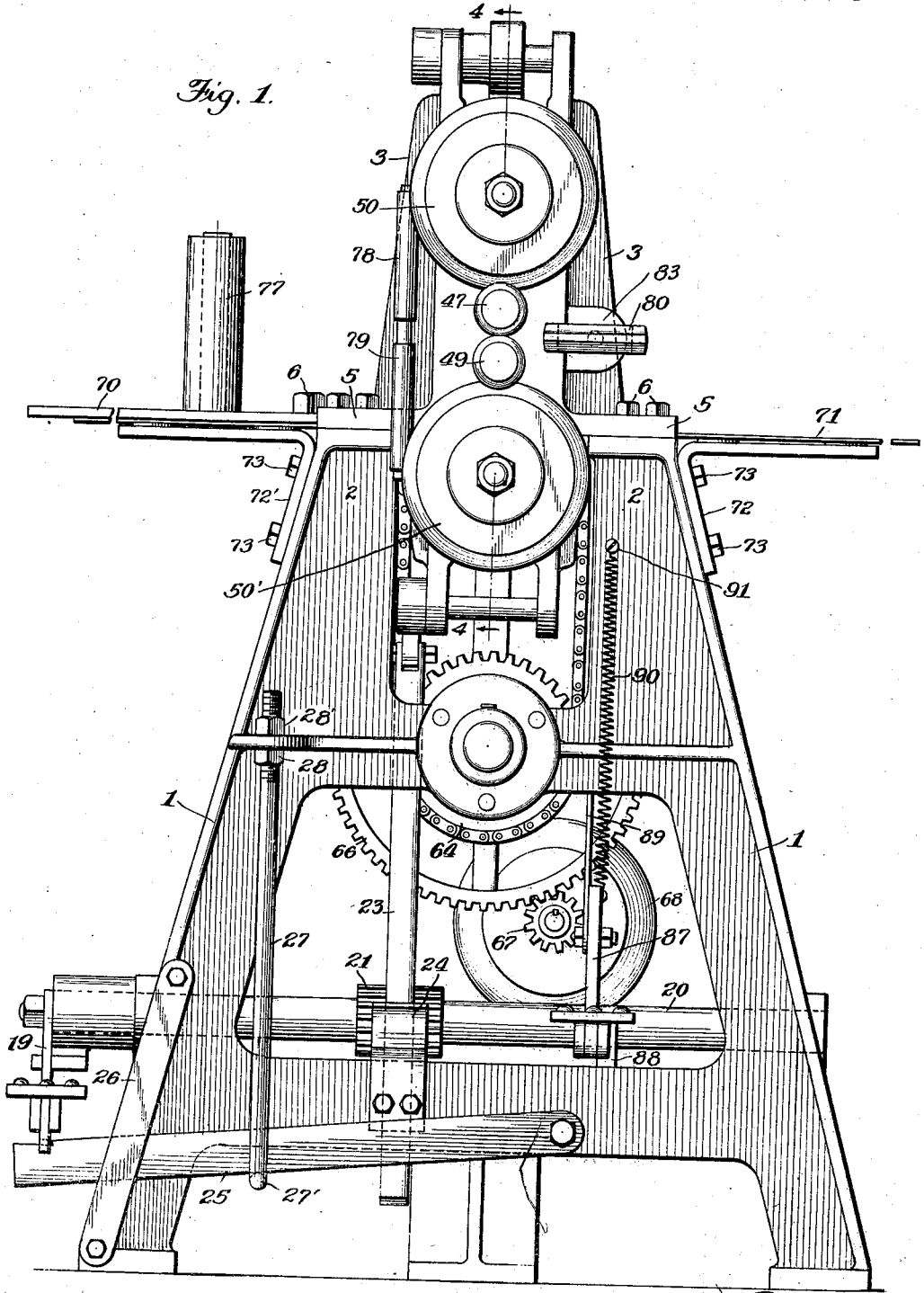
Figure 1 is a front elevation of such a device.
Figure 2:
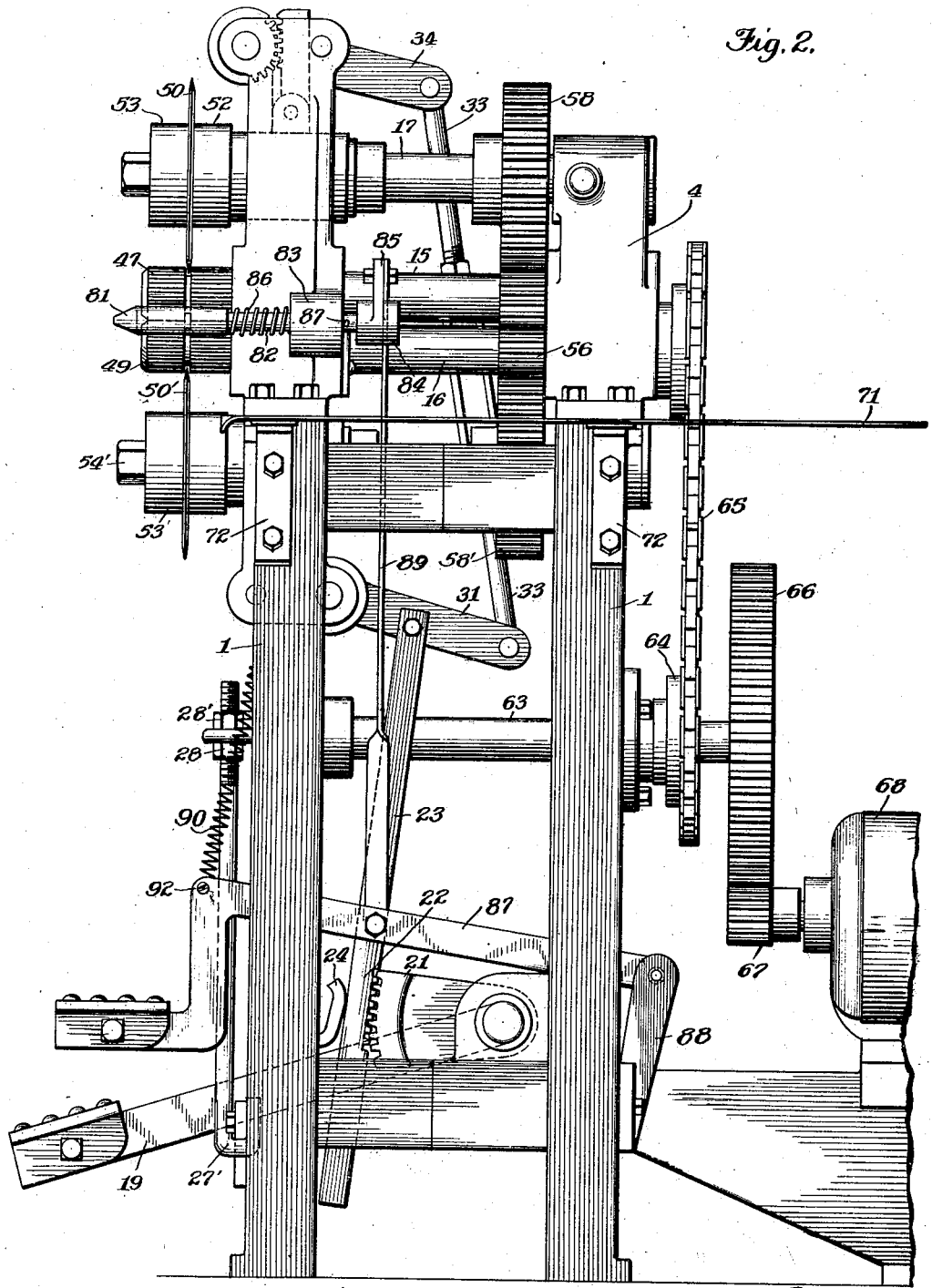
Figure 2 is a side elevation of the same.

In the form shown my device consists of suitable supporting legs or brackets 1—1 connected together to form a machine frame 2, to the top of which are rigidly secured two cast members 3 and 4 by means of feet 5 integral with said cast members and bolts 6. The cast member 3 comprises a central body portion 7 and upper and lower yokes 8 and 8' extending from said body portion, the lower yoke extending downwardly below the top of the machine frame 2. As shown the upper and lower yokes 8 and 8' are similar and comprise a pair of upright parallel guides suitably spaced from each other to receive a laterally movable bearing. The movable bearing 9 is received in the yoke 8 and the movable bearing 9' in the yoke 8'. The cast member 4 comprises a central body portion 10 and upper and lower yokes 11 and 12 extending from said body portion. As shown the yokes 11 and 12 are substantially similar and comprise a pair of upright parallel guides suitably spaced from each other to receive the pivotally mounted bearings 13 and 13' respectively. The bearings 13 and 13' are similarly pivotally mounted in their respective yokes 11 and 12, as shown in Figure 5, by means of pins 14 or other suitable means rigidly secured in the yoke and pivotally engaging the bearings 13 and 13' at approximately their centers. The central body portions of the members 3 and 4 are correspondingly bored to provide fixed bearings for the ends of shafts 15 and 16 which are parallel to each other and are disposed one above the other. A shaft 17 is positioned in the bearings 9 and 13 and a shaft 17' is positioned in the bearings 9' and 13'. The movable bearings 9 and 9' are arranged in the yokes 8 and 8' to move vertically and at the same time adjust themselves to accommodate the ends of the shafts 17 and 17' respectively, the opposite ends of which are positioned in the bearings 13 and 13'. Suitable means to be hereinafter described are provided for controlling the positions of the bearings 9 and 9'. As shown springs 18 and 18' are positioned between the central body portion 7 of the member 3 and the movable bearings 9 and 9' respectively, said springs holding said movable bearings in their normal inoperative position.

In the form shown the positions of the bearings 9 and 9' are also controlled by a foot treadle or lever 19 which is rigidly connected in any suitable manner to a shaft 20 journaled in the machine frame 2. A gear segment 21 is rigidly fixed to the shaft 20 and is adapted to mesh with gear teeth 22 formed on a rod 23, said members being kept in mesh by means of a member 24 which is fastened to the frame 2 abutting against the rod 23. The downward movement of the treadle or lever 19 is limited by a lever 25 one end of which is pivoted to the machine frame and the other end of which is positioned in the path of the downward movement of the treadle 19. A rod 27 having a hooked portion 27' at its lower end adapted to receive the lever 25, is adjustably secured to a portion of the machine frame 2 by means of nuts 28 and 28'. By adjusting the nuts 28 and 28' on the rod 27 the position of said rod may be varied thus varying the position of the member 25 which limits the downward movement of the treadle or lever 19. The member 25 is also guided in its up and down movement by means of a guide member 26 mounted on and spaced from one of the supporting legs or brackets 1.

The upper end of the rod 23 is pivotally attached to a lever 31, one end of which is rigidly secured in any desirable manner to a shaft 32 journaled in ears formed at the lower end of the yoke 8', and the other end of which is pivotally connected to one end of a connecting rod 33, the other end of said rod 33 being pivotally connected to a lever 34 which is similar to the lever 31. The connecting rod, as shown, comprises two portions joined together by a turnbuckle 35 so that the rod may be adjusted to any desired length. The other end of the lever 34 is rigidly mounted in any desired manner on a shaft 36 journaled in ears formed at the upper end of the yoke 8. The levers 31 and 34 together with the connecting rod 33 form a toggle connection which operates to control the lateral movement of the movable bearings 9 and 9' by means of the treadle 19.

The shafts 32 and 36 have rigidly secured thereon in any desired manner gears 37 and 38 respectively which are adapted to mesh with teeth formed on elements 39 and 40. The elements 39 and 40 are pivotally mounted in ears 41 and 42 respectively formed on the movable bearings 9 and 9' respectively. Pins 43 and 44 are provided in the yokes 8 and 8' for holding the elements 39 and 40 in mesh with their respective gears. When the treadle 19 is depressed the bearings 9 and 9', through the mechanism above described are moved towards the fixed bearings in the central body portion 7 of the cast member 3 against the force of the springs 18 and 18'.

In the form shown my improved cutting mechanism is mounted upon the ends of the shafts 15, 16, 17, and 17', and comprises a pair of disks or knurled rollers 46 and 47 rigidly attached to the shaft 15 beyond the fixed bearings in the body portion 7, and a pair of disks or knurled rollers 48 and 49 rigidly attached to the shaft 16 directly below and in rolling contact with the rollers 46 and 47 on the shaft 15. The adjacent faces of these pairs of rollers are preferably flat, substantially parallel and suitably spaced from each other to permit the cutters 50 and 50' upon the shafts 17 and 17' to enter the respective spaces between them and cooperate with the edges of the rollers to operate as a shear. The cutters 50 and 50' are similar and each is merely a circular disk suitably formed at its edges to cooperate with its corresponding rollers and is rigidly secured to the shaft upon which it is mounted by collars 52 and 53 on shaft 17, and collars 52' and 53' on shaft 17'. Nuts 54 and 54' are used to force the collars together upon the disks. Of course obviously any other suitable or convenient clamping means may be used for forcing the collars together upon the disks in place of the nuts 54 and 54'.

Any suitable means may be employed or provided for rotating the shafts 15, 16, 17, and 17'. As shown, a pair of gears 55 and 56 are rigidly secured to the shafts 15 and 16 respectively of suitable size to rotatably connect the shaft 15 to the shaft 16. Gears 58 and 58' are rigidly secured to the shafts 17 and 17' respectively and are of suitable size to rotatably connect the shaft 15 to the shaft 17 and the shaft 16 to the shaft 17' when the treadle or lever 19 is depressed or in its operative position. When the treadle 19 is not depressed the springs 18 and 18' will hold the movable bearings in their upper and lower positions respectively forcing the gears 58 and 58' out of mesh with their corresponding gears on the shafts 15 and 16. It will therefore be noticed that the rotatable cutters 50 and 50' will rotate only when moved to their cutting or operative positions by depressing the treadle 19. Upon the machine frame 2 is suitably mounted a drive shaft 63 having rigidly fixed thereon a sprocket wheel 64 which is connected by a chain 65 to a sprocket wheel 57 rigidly fixed on the shaft 15 beyond the fixed bearing in the body portion 10 of the cast member 4. A gear 66 is fixed on the drive shaft 63 and is in mesh with a gear 67 driven by a motor 68.

In the preferred construction also suitable means are provided for supporting the tire or other material being operated upon. Tables or plates 70 and 71 are supported on the machine frame 2 by means of supporting brackets 72 and 72' secured to the supporting legs 1—1. As shown, a pair of horizontal rollers 74 and 74' are mounted in suitable brackets upon the plates or tables in position to support the tire in the most convenient position. These rollers obviously aid in feeding the tire or other material being operated upon to the cutters. As shown, suitable means are also provided for guiding the material to the cutters, for this purpose an arm 75 is shown pivotally mounted upon the plate 70 as at 76, and provided with a suitable vertical roller 77 positioned to engage the edge of the tire to direct the same to the cutters. Obviously if desired the arm 75 may be moved to any desired position and clamped against accidental displacement thus providing an accurate adjustable guide for the device. Additional vertical rollers 78 and 79 are mounted in suitable brackets adjacent the cutters 50 and 50' and are adapted to further aid the feeding and guiding of the tire or other material being operated upon to the cutters.

To facilitate the positioning of the tire on the rollers 47 and 49 prior to the cutting of the beads therefrom the following novel means are provided. A rectangular frame member 80, the forward end or face of which is tapered as at 81, is rigidly mounted at one end of a shaft 82 journaled in a collar or bearing 83 formed integral with the cast member 3. On the other end of the shaft 82 is mounted a collar 84 having an integral arm 85 extending therefrom. A spring means 86 is positioned between the frame member 80 and one face of the bearing or collar 83 tending to force the frame member away from the bearing 83. A pin 87 is mounted in on the shaft 82, as shown, to limit the movement of the frame 80 away from the bearing or collar 83. A treadle or lever 87 is pivotally attached at one end to a member 88 rigidly secured to a portion of the machine frame 2 and is pivotally connected intermediate its ends to one end of a rod 89, the opposite end of which is pivotally connected to the free end of the arm 85 on the collar 84. A spring 90 one end of which is secured to the frame 2 as at 91 has its other end secured to a portion of the treadle 87 as shown at 92. When the treadle 87 is depressed the frame member 80 on the shaft 82 will be rotated through an angle of 180 degrees thus moving it from the horizontal position shown in Fig. 1 to a vertical position. Upon the release of the treadle 87 the spring means 90 will bring the mechanism back to its normal position where the frame member 80 is in horizontal position. The spring means 86 on the shaft 82 allows the member 80 to accommodate itself to tires of various sizes and depths.

In operation the tire is positioned upon the horizontal rollers 74 and 74' on the tables or plates 70 and 71, the frame member 80 which is in its horizontal position is then inserted into the mouth of the tire between the beads or clenchers, the foot lever or treadle 87 is then depressed moving the frame member 80 from its horizontal position to a vertical position thus expanding or opening up the mouth of the tire and separating the beads sufficiently to enable the operator to readily slip the tire over the rollers 47 and 49 as shown in dotted lines in Figure 1. As soon as the tire is positioned ready to be operated upon the treadle or lever 19 is depressed connecting the shafts 17 and 17' to the driving mechanism of the device and at the same time forcing the cutters 50 and 50' through the fabric, the edges of the cutters being preferably sharpened to facilitate this operation. As the tire is being cut it is gradually being fed to the cutters because of the rotation of the cutters and cutting rollers 47 and 49.

Having thus described my invention it is obvious that various immaterial modifications may be made in my device without departing from the spirit of my invention; hence I do not wish to be understood as limiting myself to the exact form or construction shown.

What I claim as new and desire to secure by Letters Patent is:

1. In a machine of the class described, a plurality of cutting instrumentalities each comprising one fixed and one movable cutter which are adapted to cooperate as a shear, said fixed cutters being mounted one above the other and in rolling contact with each other and adapted to receive thereon the material to be cut, means for normally maintaining said movable cutters out of operative position and a manually operated mechanism for simultaneously controlling the distance between the fixed and movable cutters of each instrumentality, in combination with means for facilitating the position of the material on said fixed cutters, said last mentioned means comprising a frame member normally held in position and a mechanism for manually rotating said frame member to a vertical position.

2. In a machine of the class described, a plurality of instrumentalities disposed one above the other, each instrumentality comprising one fixed and one movable cutting member which are adapted to cooperate as a shear, means for normally maintaining said movable cutters out of operative cutting position, manually operated mechanism for controlling the distance between said fixed and movable member in response to action by said means and means for expanding the material to facilitate positioning between the fixed and movable cutting member and to reduce lateral strain thereon.

3. In a device of the character described, a plurality of cutting instrumentalities disposed one above the other, each of the instrumentalities comprising a cutting member and a supporting member adapted to cooperate as a shear, means for normally maintaining one of the members of each instrumentality out of operative cutting position, means for manually bringing into and then maintaining the members in each instrumentality in operative cutting position and means for supporting and expanding the material being cut prior to its introduction between the cutting members and the adjacent supporting members.

In testimony whereof I affix my signature.

HUGO REICHEL.